US007826522B2

(12) United States Patent
Sumesaglam (10) Patent No.: US 7,826,522 B2
(45) Date of Patent: Nov. 2, 2010

(54) AUTOMATIC CALIBRATION CIRCUIT FOR A CONTINUOUS-TIME EQUALIZER

(75) Inventor: Taner Sumesaglam, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 11/728,879

(22) Filed: Mar. 27, 2007

(65) Prior Publication Data
US 2008/0240218 A1 Oct. 2, 2008

(51) Int. Cl.
*H03H 7/30* (2006.01)
*H03H 7/40* (2006.01)
*H03K 5/159* (2006.01)

(52) U.S. Cl. .............. 375/229; 375/230; 375/231; 375/232; 375/233; 333/18; 333/28 R (58) Field of Classification Search ........ 375/229–232, 375/350; 333/18, 28 R
See application file for complete search history.

(56) References Cited

U.S. PATENT DOCUMENTS

| 6,995,627 | B2* | 2/2006 | Casper et al. ............. 333/18 |
| 7,003,028 | B1* | 2/2006 | Bishop et al. ............ 375/232 |
| 2004/0041652 | A1* | 3/2004 | Takahashi ............... 333/28 R |
| 2005/0185710 | A1* | 8/2005 | Gai et al. ................. 375/232 |
| 2006/0019627 | A1* | 1/2006 | Talbot .................... 455/296 |

OTHER PUBLICATIONS

Choi, et al., "A 0.18-um CMOS 3.5-Gb/s Continuous-Time Adaptive Cable Equalizer Using Enhanced Low-Frequency Gain Control Method", Mar. 2004, IEEE Journal of Solid State Circuits, vol. 39, p. 419-425.*
United States Patent Application, pending, not yet published, U.S. Appl. No. 11/648,340, filed Dec. 28, 2006, to Taner Sumesaglam.
Hartman et al., "Continuous-Time Adaptive-Analog Coaxial Cable Equalizer in 0.5um CMOS", Dept. of Electrical/Computer Engineering, Univ. of Toronto, 1999 IEEE, pp. 97-100.
Tam et al., "A Novel Mixed-Mode Adaptive Equalization System for High-Speed 2-Level Pam Signals", IEEE Symp. on Circuits and Systems, May 2000, pp. 749-752.
Lee et al., "Low-Power Area-Efficient High-Speed I/O Circuit Techniques", IEEE Journal of Solid-State Circuits, vol. 35, No. 11, Nov. 2000, pp. 1591-1599.
Casper et al., "An Accurate and Effifcient Analysis Method for Multi-Gb/s Chip-to-chip Signaling Schemes", 2002 Symp. on VSLI Circuits Digest of Technical Papers, pp. 54-57.
Zhang et al., "A BiCMOS 10Gb/s Adaptive Cable Equalizer", Dept. of ECE, Univ. of California Irvine, 2003 IEEE, pp. 49-52.
Hanumolu et al., "Analysis of PLL Clock Jitter in High-Speed Serial Links", IEEE Trans. on Circuits and Systems II, Analog/Digital Signal Procs., vol. 50, No. 11, pp. 879-886.

(Continued)

*Primary Examiner*—Mohammad H Ghayour
*Assistant Examiner*—Sung Ahn
(74) *Attorney, Agent, or Firm*—Philip A. Pedigo (57) ABSTRACT

Embodiments of the invention are generally directed to systems, methods, and apparatuses for an automatic calibration circuit for a continuous-time equalizer (CTE). In some embodiments, the calibration circuit separately locks the direct (DC) voltage swing and the alternating (AC) voltage swing of a CTE to reference voltage.

15 Claims, 5 Drawing Sheets

OTHER PUBLICATIONS

Zerbe et al., "Equalization and Clock Recovery for a 2.5-10Gb/s 2-PAM/4-PAM Backplance Transceiver Cell", IEEE Jour of Solid-State Circuits, vol. 38, No. 12, pp. 2121-2130.

Hoyos et al., "Mixed-Signal Equalization Architectures for Printed Circuit Board Channels", IEEE Trans on Circuits/Systems I, vol. 51, No. 2, pp. 264-274.

Choi et al., "A 0.18-um CMOS 3.5-Gb/s Continuous-Time Adaptive Cable Equalizer using Enhanced Low-Frequency Gain Control Method", Jour of Soild-State Circuits, vol. 39, No. 3.

Balamurugan et al., "Receiver Adaption and System Characterizations of an 8Gbps Source-Synchronous I/O Link using On-Die Circuits in 0.13um CMOS", 2004 Symposium on VLSI Circuits Digest of Technical Papers, pp. 356-359.

Lin et al., "A Digital Power Spectrum Estimation Method for the Adaption of High-Speed Equalizers", IEEE Trans on Circuits and Systems I, vol. 51, No. 12, pp. 2436-2443.

Jaussi et al., "8-Gb/s Source-Synchronous I/O Link with Adaptive Receiver Equalization, Offset Cancellation, and Clock De-Skew", IEEE Jour of Solid-State Circuits, vol. 40, No. 1, pp. 80-88.

Sorna et al., "A 6.4 Gb/s CMOS SerDes Core with Feedfoward and Decision-Feedback Equalization", 2005 IEEE International Solid-State Circuit Conference, pp. 62-63, & 585.

Gondi et al., "A 10 Gb/s CMOS Adaptive Equalizer for Backplane Applications", 2005 IEEE International Solid-State Circuit Conference pp. 328-329, & 601.

Payne et al., "A 6.25-Gb/s Binary Transceiver in a 0.13um CMOS for Serial Data Transmission Across High Loss Legacy Backplane Channels", IEEE Journal of Solid-State Circuits vol. 40, No. 12, pp. 2646-2657.

Jri Lee, "A 20-Gb/s Adaptive Equalizer in 0.13um CMOS Technology", IEEE Journal of Solid-State Circuits, vol. 41, No. 9, pp. 2058-2066.

Hollis et al., "Mitigating ISI Through Self-Calibrating Continuous-Time Equalization", IEEE Trans on Circuits and Systems I, vol. 53, No. 10, pp. 2234-2245.

* cited by examiner

AUTOMATIC CALIBRATION CIRCUIT FOR A CONTINUOUS-TIME EQUALIZER

TECHNICAL FIELD

Embodiments of the invention generally relate to the field of integrated circuits and, more particularly, to systems, methods and apparatuses for an automatic calibration circuit for a continuous-time equalizer.

BACKGROUND

Multi-gigibit chip-to-chip interconnect channels can be very lossy. For example, they may attenuate high frequency signals more than low frequency signals. This frequency dependent difference in signal attenuation can complicate the recovery of received data and can limit the maximum speed of data transfer.

Conventional systems frequently use transmit pre-emphasis and/or receive continuous-time equalization (CTE) to mitigate signal attenuation on a lossy channel. As data transfer rates increase, the power consumed by these conventional methods also increases. Thus, in conventional systems, more and more power is being consumed to achieve a target bit-error rate (BER).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for an automatic calibration circuit for a continuous-time equalizer (CTE). In some embodiments, the automatic calibration circuit increases the effectiveness of receive side equalization. In addition, the automatic calibration circuit may also enable power reduction on the transmit side by correcting for CTE and process/voltage/temperature (PVT) variations. As is further described below, when enabled, the calibration circuit separately locks the direct (DC) voltage output swing (or voltage magnitude) and the alternating (AC) voltage output swing (or voltage magnitude) of a CTE to a reference voltage.

Figure 1:
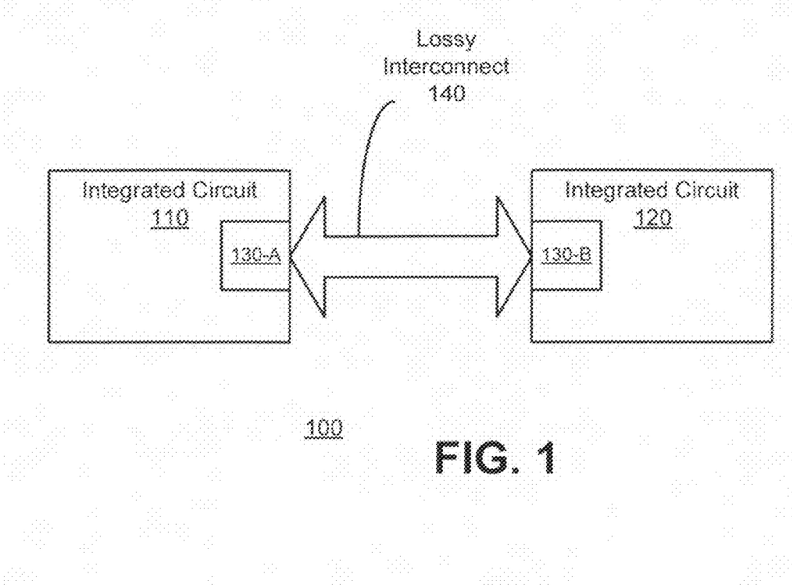
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. Computing system 100 includes integrated circuits 110 and 120 coupled together through lossy interconnect 140. In some embodiments, integrated circuit 110 is memory controller and integrated circuit 120 is a memory device (e.g., a dynamic random access memory (DRAM)). In such embodiments, lossy interconnect 140 may be a memory interconnect.

Integrated circuits 110 and 120 each include interface 130. Interface 130 may include one or more transmitters (TXs) and receivers (RXs) as well as other circuits (e.g., buffers, clock circuits, etc.). At least one of the RXs may include a continuous-time equalizer (CTE) to reduce the ISI for data received from lossy interconnect 140.

In some embodiments, a digital automatic tuning circuit is coupled with the CTE. The automatic tuning circuit is capable of altering a magnitude response (as a function of frequency) of the CTE. As is further described below with reference to FIGS. 2-6, the calibration circuit can reduce ISI for signals received from lossy channel 140 by locking the DC output swing and the AC output swing of the CTE to a reference voltage. In some embodiments, the reference voltage is simply generated by a resistor divider.

Figure 2:
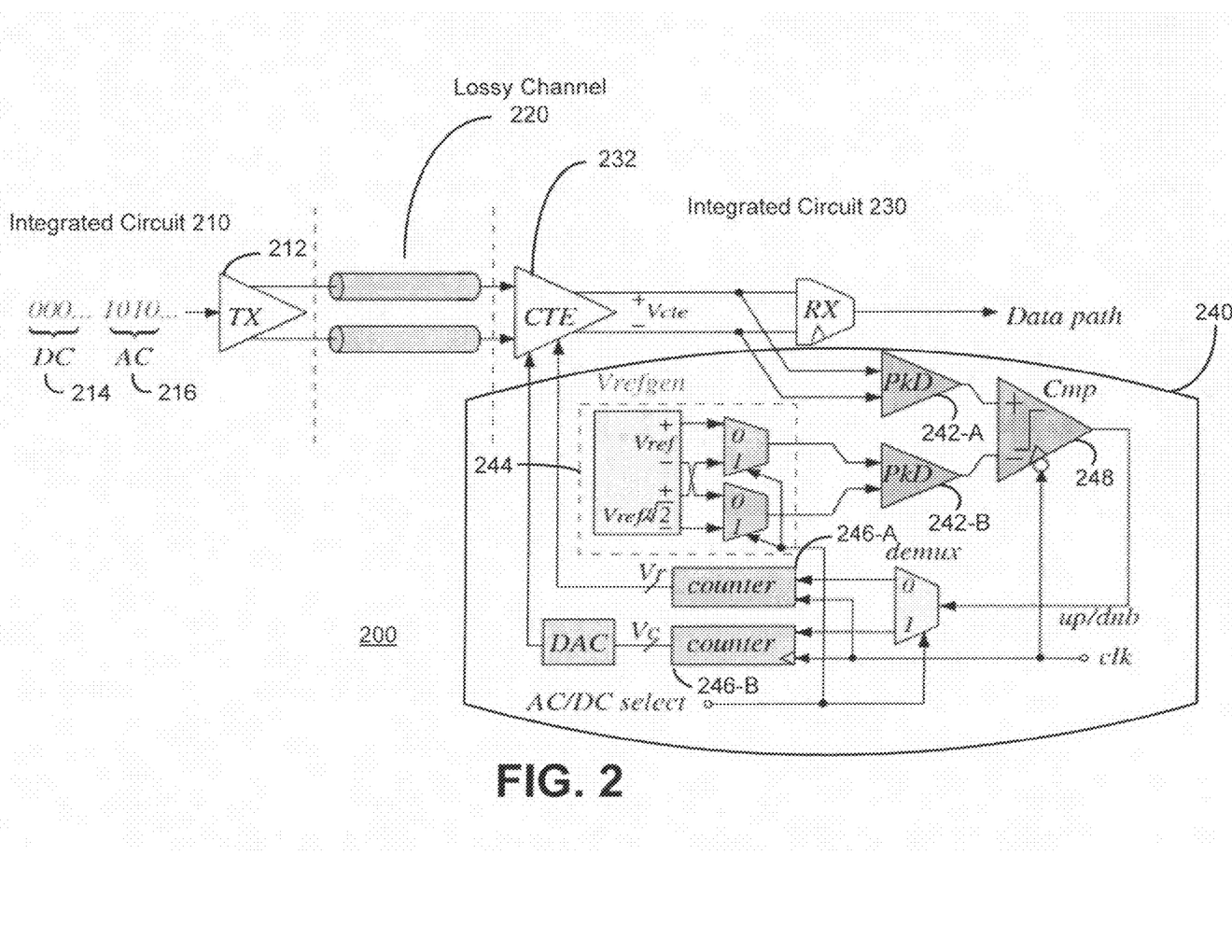
FIG. 2 is a circuit diagram illustrating selected aspects of a self-calibrating continuous-time equalizer (CTE) implemented according to an embodiment of the invention.

FIG. 2 is a circuit diagram illustrating selected aspects of a self-calibrating continuous-time equalizer (CTE) implemented according to an embodiment of the invention. System 200 includes integrated circuits 210 and 230 coupled together by lossy channel 220. Integrated circuits (ICs) 210 and 230 may be any of a wide variety of ICs including, for example, memory controllers, DRAMs, advanced memory buffers, and the like. Lossy channel 220 may be nearly any lossy interconnect including, for example, a memory bus (such as a double data rate (DDR) bus).

Integrated circuit 210 includes transmitter 212 to transmit data (at an appropriate data rate) over lossy channel 220. In some embodiments, the calibration of a CTE is a two stage process (or a multistage process). In such embodiments, integrated circuit 210 (or, simply, chip 210) is capable of sending a signal having substantially constant data (e.g., 214) and a signal having alternating data (e.g., 216). A clock (or other selection mechanism) may be used to determine which signal chip 210 transmits (e.g., either constant data 214 or alternating data 216). The terms "stage" and "phase" may be used synonymously throughout this description.

Chip 230 receives the signal (e.g., either constant data 214 or alternating data 216) from lossy channel 220. CTE 232 provides continuous-time equalization for the received signal. In some embodiments, digital automatic calibration circuit 240 is coupled with CTE 232. For example, the output of CTE 232 may provide an input to calibration circuit 240 and an output of calibration circuit 240 may provide an input to CTE 232. In some embodiments, calibration circuit 240 includes peak detectors 242, reference voltage generator 244, counters 246, and comparator 248. In alternative embodiments, calibration circuit 240 may include more elements, fewer elements, and/or different elements.

Figure 3:
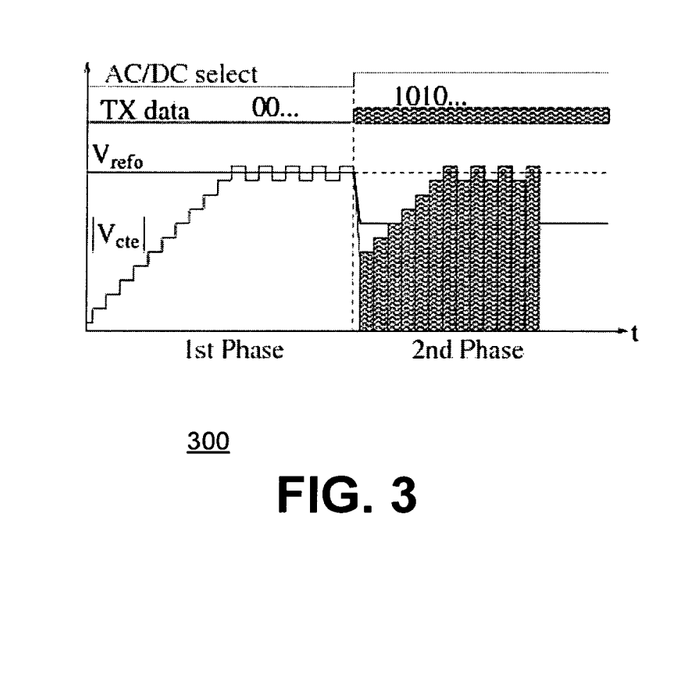
FIG. 3 is a conceptual diagram illustrating selected aspects of a two phase CTE calibration scheme according to an embodiment of the invention.

In some embodiments, calibration circuit 240 is essentially a bang-bang type magnitude-lock loop. Referring to FIGS. 2 and 3 together, calibration circuit 240 may have two phases of operation. In the first phase, the low-frequency or DC output swing of CTE 232 is calibrated by locking the output swing to a reference voltage. As is further described with reference to FIG. 7, the reference voltage may be generated by a resistor string. In the second phase, similarly, the high-frequency or AC output swing is locked. After the first and second phases are completed, calibration circuit 240 may be powered down (although circuitry driving certain control signals (e.g., counters 246) may remain powered). The first and second phases are more fully described below.

In the first phase, transmitter 212 may send a constant data signal (e.g., all 0's or all 1's) by pulling one pad to a high voltage while the other pad is pulled to a low voltage. A digital counter 246 is driven by an up/down signal coming from comparator latch circuit 248 which is given by $$V_{up/dnb} = \text{sgn}(K_{pd}V_{cte,dc} - K_{pd}V_{ref})K_{cmp}$$

where $V_{cte,dc}$ and $V_{ref}$ are peak-to-peak values of signals at the output of CTE 232 and Vrefgen circuit 244, respectively. $K_{pd}$ and $K_{cmp}$ represent the gain of the peak detector and comparator 248, respectively. The loop gradually adjusts the DC voltage gain of CTE 232 which is controlled by a digital counter 246. When the loop is converged, $V_{up/dnb}$ toggles between up and down. Ignoring the error due to toggling, the following expression holds $$V_{cte,dc} = V_{ref} \quad (1)$$

In the second phase, transmitter 212 may send an alternating data signal (e.g., 1010101 ... ) at full speed. $V_{up/dnb}$ is given by $$V_{up/dnb} = \text{sign}\left(\left(K_{pd}\text{RMS}(V_{cte,ac}) - K_{pd}\frac{V_{ref}}{\sqrt{2}}\right)K_{amp}\right).$$

The following expressing holds when the loop is converged $$\text{RMS}(V_{cte,ac}) = \frac{V_{ref}}{\sqrt{2}}. \quad (2)$$

Assuming that the output of CTE 232 is a sinusoidal waveform and combining (1) and (2)

$$V_{ref} = V_{cte,dc} = V_{cte,ac}.$$

In some embodiments, two separate voltage references are used for the DC voltage gain and the AC voltage gain because the peak detector detects the RMS value of the input signal. The large signal input-output relation of the peak detector can be found as $$V_{o,rms}^2 = \frac{I_b}{2\beta} - (V_{cm} - V_T)^2 - \frac{V_{in,rms}^2}{4}.$$

In some embodiments, the tuning process is performed as part of a training sequence for lossy channel 220. The training sequence may be performed periodically and/or in response to certain events. For example, on initiation, chips 210 and 230 may perform handshaking to determine when 214 and 216 are going to be transmitted. Subsequently, chip 210 may transmit 214 and 216 and calibration circuit 240 may calibrate CTE 232. In some embodiments, calibration circuit 240 may be disabled after CTE 232 is tuned (e.g., by turning off the clk input).

In alternative embodiments, there are additional channels connecting chips 210 and 230. In such embodiments, some channels may be allocated for tuning and some may be allocated for normal operation. For example, tuning circuit 240 may generate a control signal for CTE 232 on a first channel. The control signal may then be copied to CTEs in the channels allocated for normal operation. In such embodiments, tuning circuit 240 may operate continuously.

Figure 4:
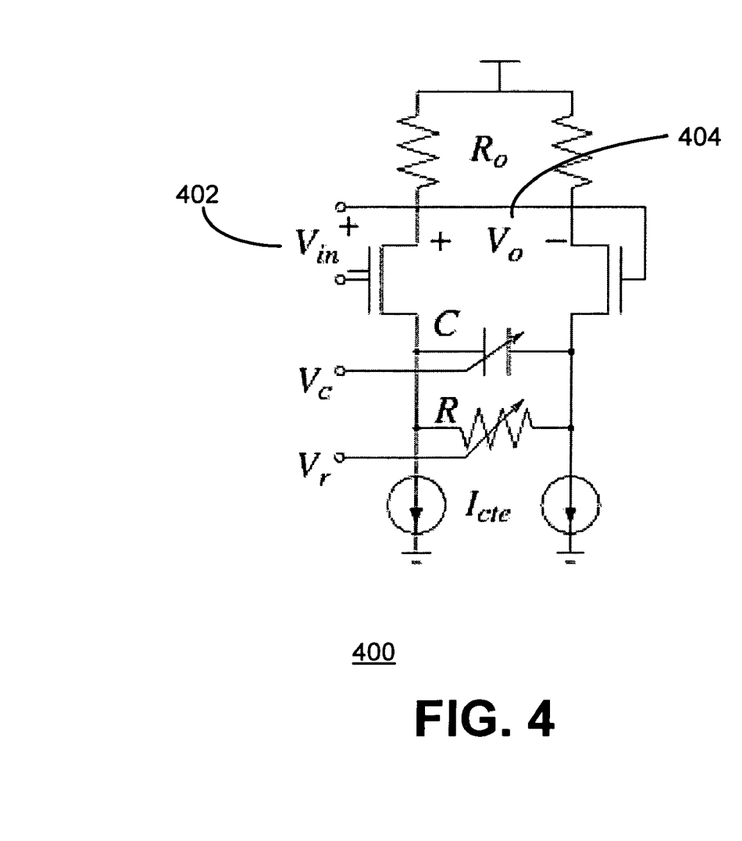
FIG. 4 is a circuit diagram illustrating selected aspects of a CTE implemented according to an embodiment of the invention.

FIG. 4 is a circuit diagram illustrating selected aspects of a continuous-time equalizer (CTE) according to an embodiment of the invention. CTE 400 receives a differential input 402 from a lossy channel (e.g., lossy channel 220, shown in FIG. 2) and provides a differential output 404 to a receiver and a calibration circuit (e.g., calibration circuit 240, shown in FIG. 2). In some embodiments R is a tunable resistor. The gate voltage ($V_r$) may be generated by a digital-to-analog converter (DAC) circuit. In some embodiments, the DC voltage gain of the CTE is calibrated by adjusting the value R. The AC voltage gain may also be dependent, in part, on R and, thus, in some embodiments, the DC voltage gain is calibrated before the AC voltage gain is calibrated.

In contrast, adjusting C may calibrate the AC voltage gain without changing the DC voltage gain. The value of C may be determined by a number of capacitors in a switching series. For example, if the up/down counter in the calibration circuit is increasing, then the number of capacitors that are active in C is also increasing. This increases the total capacitance of C. Similarly, if the up/down counter is decreasing, then the number of capacitors that are active in C is also decreasing. This decreases the total capacitance of C. As the capacitance of C changes, the pole/zero of CTE 400 shifts. The shifting of the pole/zero alters the AC (or high frequency) voltage gain of CTE 400. In alternative embodiments, CTE 400 may have more elements, fewer elements, and/or different elements.

Figure 5:
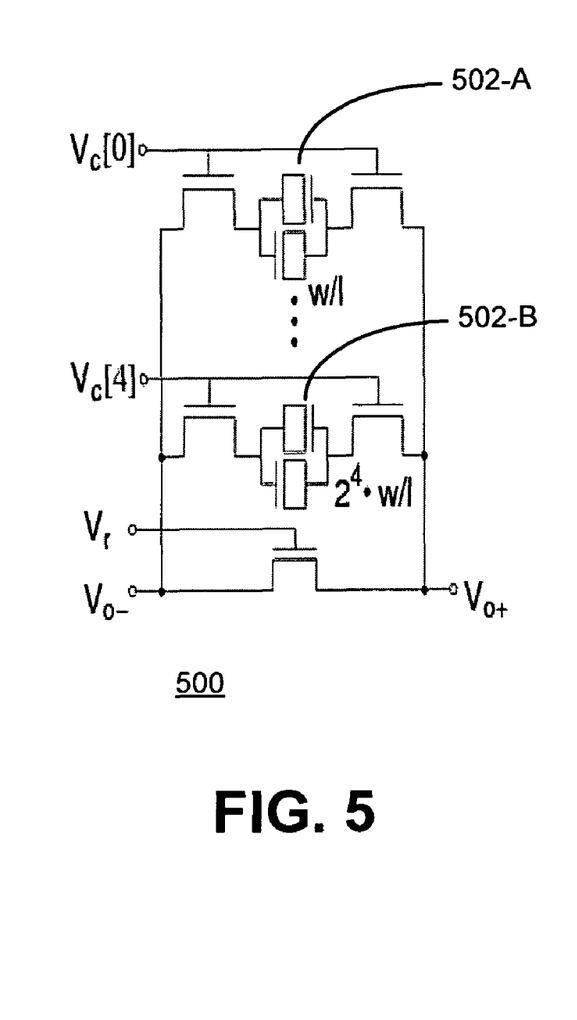
FIG. 5 is a circuit diagram illustrating selected aspects of a tunable RC circuit for a CTE implemented according to an embodiment of the invention.

FIG. 5 is a circuit diagram illustrating selected aspects of a tunable RC circuit for a CTE implemented according to an embodiment of the invention. RC circuit 500 includes a number of unit capacitors 502. A five bit control signal (provided by, e.g., counter 246, shown in FIG. 2) provides $V_c[0]$ through $V_c[4]$. When $V_c$ is high, the corresponding unit capacitor turns on. As more capacitors are turned on, the capacitance of RC circuit 500 increases. Similarly, as capacitors are turned off, the capacitance of RC circuit 500 decreases. The AC voltage gain of the CTE increases or decreases as the capacitance of RC circuit 500 increases or decreases. The value of $V_r$ may be controlled by a DAC in the corresponding calibration circuit. In alternative embodiments, RC circuit 500 may have more elements, fewer elements, and/or different elements. For example, some embodiments of RC circuit 500 may include inductors and/or may use analog circuitry such as a varactor.

Figure 6:
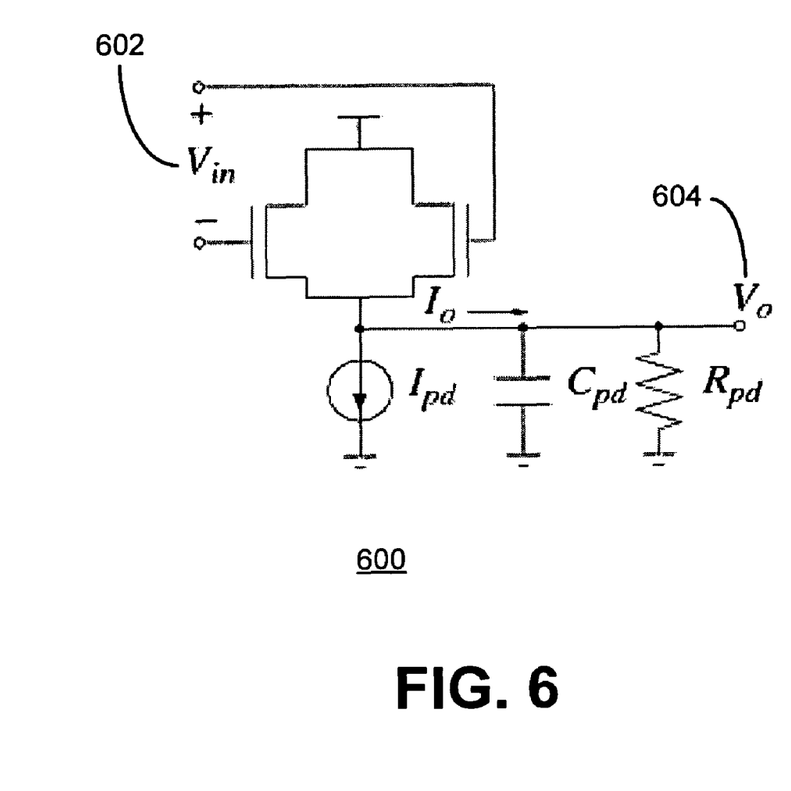
FIG. 6 is a circuit diagram illustrating selected aspects of a peak detector circuit implemented according to an embodiment of the invention.

FIG. 6 is a circuit diagram illustrating selected aspects of a peak detector according to an embodiment of the invention. In some embodiments, the input (602) to peak detector 600 is a differential signal (e.g., representing DC output swing, AC output swing, or a voltage reference) and may be provided by either the CTE or a voltage reference generator. In some embodiments, the output (604) of peak detector 600 is the RMS value of the input. In alternative embodiments, peak detector 600 may have more elements, fewer elements, and/or different elements.

Figure 7:
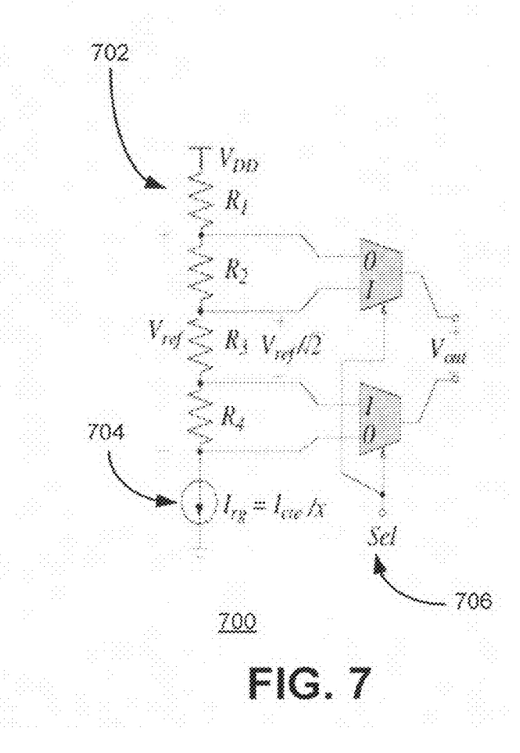
FIG. 7 is a circuit diagram illustrating selected aspects of a reference voltage generator circuit implemented according to an embodiment of the invention.

FIG. 7 is a circuit diagram illustrating selected aspects of a reference voltage generator circuit implemented according to an embodiment of the invention. In some embodiments, reference voltage generator circuit 700 includes resistor string 702. Resistor string 702 generates a voltage that is proportional to $V_{DD}$ and that is also proportional to the applied current 704. If select signal 706 is zero, then the output is $V_{ref}$. Similarly, if select signal 706 is one, then the output is $V_{ref}/$ (square root of 2).

The illustrated embodiment of reference voltage generator circuit 700 is arranged so that the common mode voltage of the reference voltage tracks the common mode voltage of the CTE. Current 702 is a fraction of the current in the CTE circuit. Both circuits may be supplied from the same power supply (and may have similar kinds of resistors). Thus, the common mode of reference voltage generator 700 should track the common mode of the CTE output. In alternative embodiments, reference voltage generator 700 may have more elements, fewer elements, and/or different elements.

Figure 8:
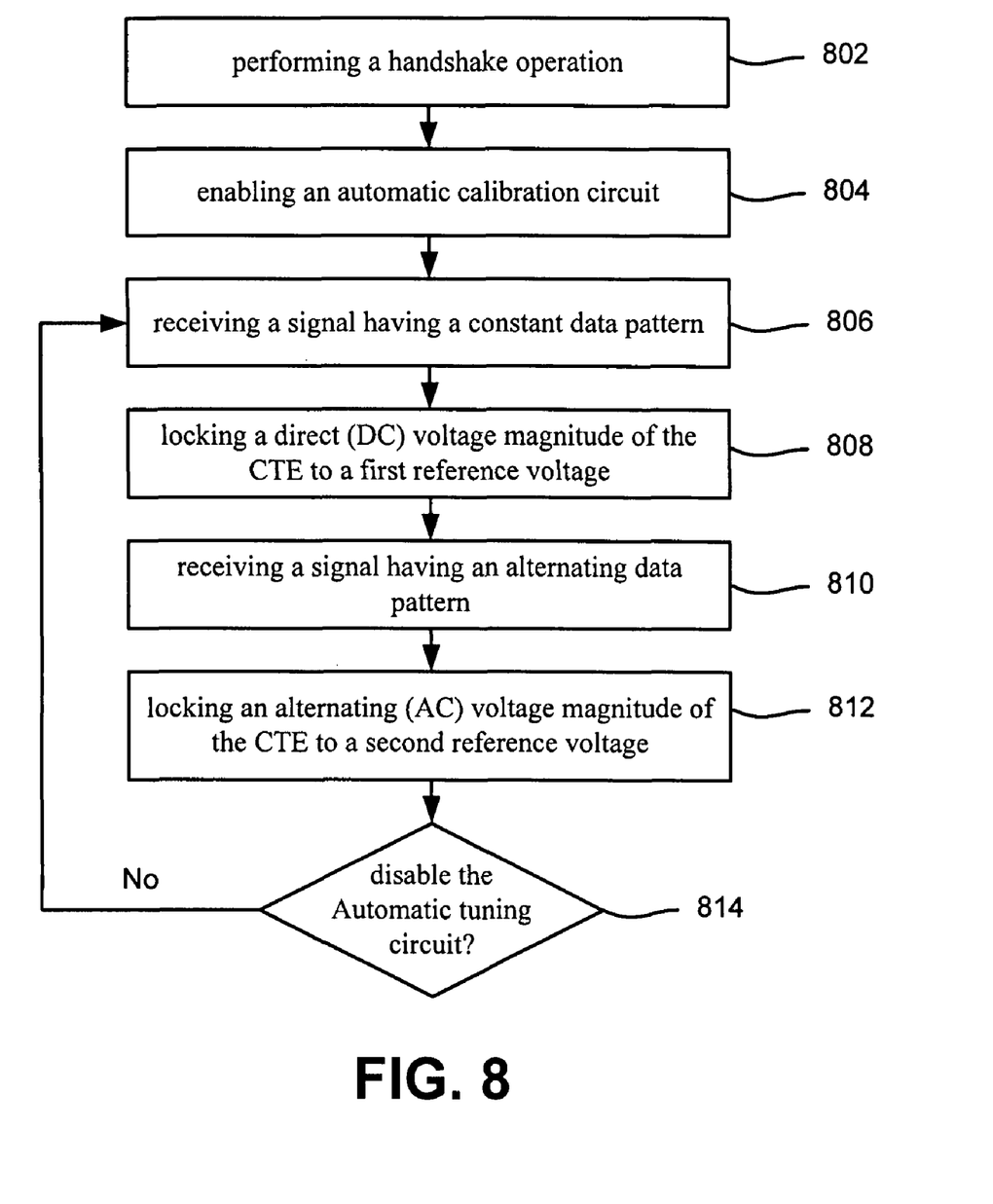
FIG. 8 is a flow diagram illustrating selected aspects of a method for automatically calibrating a CTE according to an embodiment of the invention.

FIG. 8 is a flow diagram illustrating selected aspects of a method for automatically calibrating a continuous-time equalizer according to an embodiment of the invention. Referring to process block 802, the interfaces for two chips (e.g., chips 210 and 230, shown in FIG. 2) perform a handshake operation. In some embodiments, the handshake operation is used to determine when a transmitting chip will send a signal having an alternating data pattern and when it will send a signal having a constant data pattern. As used herein, a signal having an alternating data pattern refers to a signal having a target data rate and that transitions between logical highs and logical lows. A signal having a constant data pattern refers to a signal that does not transition between a logical high and a logical low. In some embodiments, the signal having the alternating data pattern may have more high frequency content than the signal having the constant data pattern. An automatic calibration circuit is enabled at 804 (e.g., by applying a clock signal to the calibration circuit).

The receiving chip receives the signal having the constant data pattern at 806. In some embodiments, a peak detector generates a voltage proportional to the RMS value of the received signal. A voltage reference generator (e.g., 244, shown in FIG. 2) may generate a first voltage reference corresponding to a target DC voltage gain. A comparator (e.g., 248, shown in FIG. 2) compares the output of the peak detector with the first voltage reference and generates a DC control signal (e.g., using a counter 246, as shown in FIG. 2). The control signal locks the DC voltage magnitude (or output swing) of the CTE to the first reference voltage as shown by 808.

The receiving chip also receives a signal having an alternating data pattern at 810. The peak detector generates a voltage proportional to the RMS value of the received signal. The voltage reference generator may generate a second voltage reference corresponding to a target AC voltage gain. The comparator compares the output of the peak detector with the second voltage reference and generates an AC control signal (e.g., using a counter 246, as shown in FIG. 2). The AC control signal locks the AC voltage magnitude (or output swing) of the CTE to the second reference voltage as shown by 812. In some embodiments, the calibration circuit is disabled after the CTE is tuned (814).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
 a continuous-time equalizer (CTE) to receive an input from a lossy channel and to provide an output; and
 a calibration circuit coupled with the CTE, the calibration circuit including voltage reference generation circuitry_ to generate at least one reference voltage,
 wherein the calibration circuit is capable of calibrating a low-frequency gain of the CTE during a first interval of time and calibrating a high-frequency gain of the CTE during a second interval of time,
 wherein the first interval of time corresponds to a first calibration stage to lock a direct current (DC) voltage magnitude of the CTE to a first reference voltage, and the second interval of time corresponds to a second calibration stage to lock an alternating current (AC) voltage magnitude of the CTE to a second reference voltage, and
 further wherein a common mode voltage of the voltage reference generation circuitry tracks a common mode voltage of the CTE.

2. The integrated circuit of claim 1, wherein the voltage reference generation circuitry comprises:
 voltage reference generation circuitry to generate the first reference voltage and the second reference voltage.

3. The integrated circuit of claim 2, wherein calibrating the low-frequency gain of the CTE includes locking a low-frequency output swing to the first reference voltage and wherein calibrating the high-frequency gain of the CTE includes locking the high-frequency output swing to the second reference voltage.

4. The integrated circuit of claim 1, wherein the calibration circuit further comprises:
 a comparator circuitry to compare an output voltage of the CTE with the reference voltage.

5. The integrated circuit of claim 1, wherein the CTE comprises:
a gain control circuitry to control the direct current (DC) gain and the alternating current (AC) gain of the CTE.

6. The integrated circuit of claim 5, wherein the calibration circuit further comprises:
a counter circuitry to drive the gain control circuitry.

7. The integrated circuit of claim 1, further comprising:
a disable logic to disable an automatic tuning circuit.

8. A method comprising:
enabling an automatic calibration circuit, wherein the automatic calibration circuit is coupled with a continuous-time equalizer (CTE) of a first integrated circuit, the calibration circuit including voltage reference generation circuitry to generate at least one reference voltage, wherein a common mode voltage of the voltage reference generation circuitry tracks a common mode voltage of the CTE;
receiving a signal having a constant data pattern from a second integrated circuit;
locking a direct current (DC) voltage output swing of the CTE to a first reference voltage during a first calibration stage;
receiving a signal having an alternating data pattern from the second integrated circuit; and
locking an alternating current (AC) voltage output swing of the CTE to a second reference voltage during a second calibration stage.

9. The method of claim 8, wherein locking the DC output swing of the CTE to the first reference voltage comprises:
generating a DC gain control signal; and
providing the DC gain control signal to the CTE.

10. The method of claim 8, wherein locking the AC output swing of the CTE to the second reference voltage comprises:
generating an AC gain control signal; and
providing the AC gain control signal to the CTE.

11. The method of claim 8, further comprising:
disabling an automatic tuning circuit.

12. A system comprising:
a first integrated circuit having a transmitter to transmit a data signal;
a lossy channel; and
a second integrated circuit coupled with the first integrated circuit via the lossy channel, the second integrated circuit including,
a continuous-time equalizer (CTE) to receive an input from the a lossy channel and to provide an output, and
a calibration circuit coupled with the CTE, the calibration circuit including voltage reference generation circuitry to generate at least one reference voltage,
wherein the calibration circuit is capable of calibrating a low-frequency gain of the CTE during a first interval of time and calibrating a high-frequency gain of the CTE during a second interval of time,
wherein the first interval of time corresponds to a first calibration stage to lock a direct current (DC) voltage magnitude of the CTE to a first reference voltage and the second interval of time corresponds to a second calibration stage to lock an alternating current (AC) voltage magnitude of the CTE to a second reference voltage, and
further wherein a common mode voltage of the voltage reference generation circuitry tracks a common mode voltage of the CTE.

13. The system of claim 12, wherein the voltage reference generation circuitry comprises:
voltage reference generation circuitry to generate the first reference voltage and the second reference voltage.

14. The system of claim 13, wherein calibrating the low-frequency gain of the CTE includes locking a low-frequency output swing to the first reference voltage and wherein calibrating the high-frequency gain of the CTE includes locking a high-frequency output swing to the second reference voltage.

15. The system of claim 12, wherein the CTE comprises:
a gain control circuitry to control the direct current (DC) gain and the alternating current (AC) gain of the CTE.

* * * * *